Patented Aug. 12, 1924.

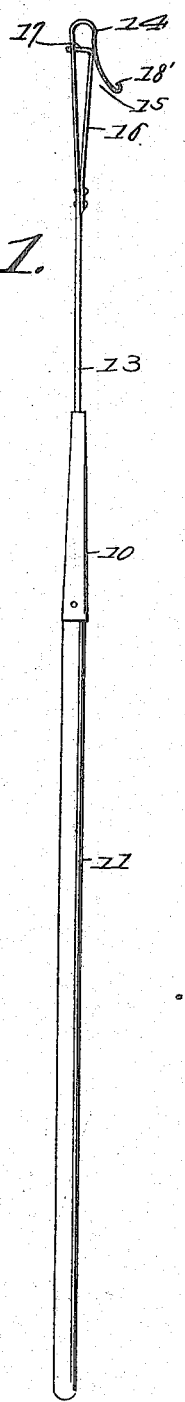
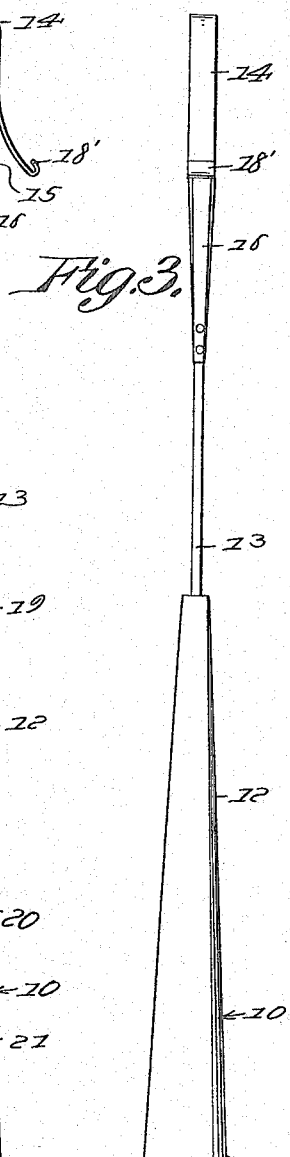
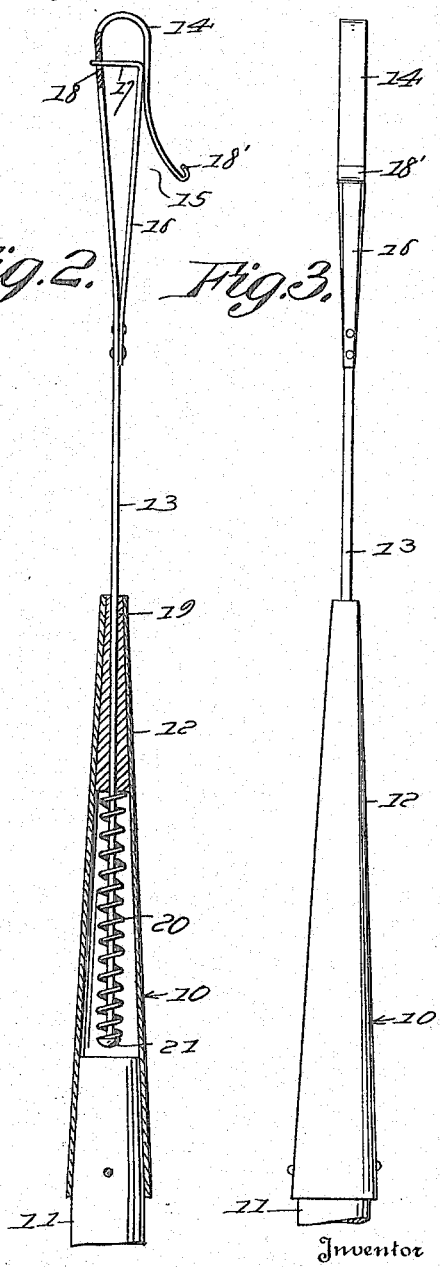

1,504,287

UNITED STATES PATENT OFFICE.

WILLIAM S. THURSTON, OF CALDWELL, IDAHO.

POULTRY AND STOCK HOOK.

Application filed June 14, 1922. Serial No. 568,218.

*To all whom it may concern:*

Be it known that WILLIAM S. THURSTON, a citizen of the United States of America, residing at Caldwell, in the county of Canyon and State of Idaho, has invented new and useful Improvements in Poultry and Stock Hooks, of which the following is a specification.

The object of the invention is to provide a device for catching stock such as poultry, sheep and the like and adapted to be made of different sizes or dimensions to suit the character of the stock to be engaged, and particularly to provide a device for this purpose whereby a leg of the stock may be caught without the risk of breaking or seriously injuring the same and yet under conditions insuring an efficient holding of the animal against escape; and with this object in view the invention consists in a construction and combination of parts of which a preferred embodiment is shown in the accompanying drawings, wherein:—

Figure 1 is a side elevational view of the structure embodying the invention.

Figure 2 is a longitudinal sectional view, enlarged, of the device.

Figure 3 is an elevational view of the structure of Figure 2 but looking in a direction at right angles to the latter.

The device consists of a ferrule 10 adapted for the reception of a staff or handle 11 and extended to form a guide 12 in which is slidingly fitted a rod 13 forming the shank of a hook 14 which is transversely flattened and bent upon itself to form a tapered throat 15 yieldingly closed by a spring tongue 16 carried by the shank and terminally provided with a finger 17 operating in a guide opening 18. The spring tongue and the outer side or bill of the hook, which is preferably turned upon itself to form a lip 18 to avoid injury to the leg of the fowl or animal, combine to provide a tapered entrance to the throat of the hook so as to guide the tool in applying it to the leg of the fowl or animal, and obviously when the hook has been moved relative to the leg sufficiently to dispose the latter beyond the end of the spring tongue, the latter resumes its position to close the hook and thereby lock the leg of the animal in place.

The inner end of the hook shank extends through a guide opening 19 in a transverse partition or bar in the guide 12 and is fitted with a cushioning spring 20 coiled on said shank between the partition and the terminal head or button 21 on the shank, so that a yielding movement of the hook independently of the handle is afforded to resist the efforts of the poultry or animal to escape without affording such a restraint as to be liable to cause abrasion, breakage or other injury of the leg of the animal until such time as the latter can be brought within reach of the operator.

Having described the invention, what is claimed as new and useful is:—

1. A stock catching tool having in combination with the staff or handle a hook provided with a shank having a cushioned sliding mounting upon the staff or handle, and yielding means for closing the throat of the hook.

2. A stock catching tool having a ferrule for the reception of the end of a staff or handle and extended to form a guide, a hook having a shank slidingly fitted in said guide, a cushioning spring for yieldingly resisting tensile strain applied to the hookshank, and yielding means for closing the throat of the hook.

3. A stock catching tool having a ferrule for the reception of the end of a staff or handle and extended to form a guide, a hook having a shank slidingly fitted in said guide, a cushioning spring for yieldingly resisting tensile strain applied to the hook shank, and yielding means for closing the throat of the hook, and consisting of a spring tongue extending into the hook throat and provided with a terminal guide finger operating in a guide opening in the back of the hook.

In testimony whereof he affixes his signature.

WILLIAM S. THURSTON.